United States Patent [19]

Gough

[11] 3,868,321

[45] Feb. 25, 1975

[54] LIQUID SEPARATORS

[76] Inventor: Dick Valentine Gough, 1 Knights Bank Rd., Hill Head, Fareham, England

[22] Filed: Apr. 16, 1973

[21] Appl. No.: 351,275

[30] Foreign Application Priority Data
Apr. 19, 1972 Great Britain.................... 18249/72

[52] U.S. Cl.................... 210/86, 210/115, 210/181, 210/512
[51] Int. Cl............................................ B01d 21/26
[58] Field of Search ............ 210/86, 114, 112, 115, 210/181, 184, 512

[56] References Cited
UNITED STATES PATENTS

| | | | |
|---|---|---|---|
| 2,204,998 | 6/1940 | Ryan et al...................... | 210/112 X |
| 2,673,648 | 3/1954 | Kenney.............................. | 210/114 |
| 3,052,358 | 9/1962 | Stoermer .......................... | 210/181 |
| 3,088,592 | 5/1963 | Clark ................................ | 210/114 |
| 3,424,311 | 1/1969 | Siedenburg ........................ | 210/86 |
| 3,568,835 | 3/1971 | Hansen ........................... | 210/115 X |

Primary Examiner—John Adee

[57] ABSTRACT

A device for separating denser and lighter constituents of a liquid mixture comprises a container in which the denser constituent settles as the mixture flows in, the lighter constituent leaving through an outlet in the container upper region. A float in the container has a density between those of the constituents to be separated. As the denser constituent accumulates the float rises to operate an electrical switch that is laterally offset from it, at or adjacent a side of the container, to actuate external indication means and/or means opening a drain outlet for the settled denser constituent.

8 Claims, 2 Drawing Figures

LIQUID SEPARATORS

BACKGROUND OF THE INVENTION

This invention relates to devices for separation of a denser constituent from a mixture of liquids or of a solid material mixed with a liquid. Such mixtures of different density materials will be referred to hereinafter simply as mixtures.

The invention is particularly, but not exclusively, concerned with the separation of water from fuel oil, which is frequently required when operating an internal combustion engine, especially a diesel engine, to avoid damage that could otherwise occur in a fuel-injection system or other metering arrangement of the engine.

A device for the separation of denser and lighter constituents in a mixture of liquids is known from British Pat. No. 1,113,621, where a container is provided having an upper and a lower chamber separated by a valved partition, said lower chamber forming a liquid entry and settling region and having a drain outlet for the denser liquid, the upper chamber having an outlet for the separated lighter liquid drawn through the valve, a float body being disposed in the lower chamber having a density between those of the denser and lighter liquids whereby accumulation of the denser liquid in the lower chamber will cause the float to rise and to close the valve at the partition.

In this earlier device, when the valve has shut a warning signal is actuated by the pressure drop in the upper chamber as liquid continues to be drawn from the upper chamber, so alerting the operator to the need to clear the separated denser liquid from the lower chamber. Such an arrangement, however, gives rise to difficulties in many applications where it is important to maintain the flow of the lighter constituent but where the rate of flow is so high that the warning actuated by the pressure drop in the upper chamber may be insufficient to ensure that lower chamber can be cleared and the valve reopened in time to avoid interruption of the supply of the ligher constituent.

SUMMARY OF THE INVENTION

According to the present invention, a device for the separation of denser and lighter constituents of a mixture comprises a container in the lower region of which the denser constituent is allowed to settle, as before, to raise a float, there now being provided an electrical switch disposed on or adjacent a side of the container to be laterally offset from the float and operable by the rising of the float to actuate external indication means and/or means adapted to open said drain outlet and allow the settled denser constituent to escape.

Preferably, the electrical switch is in the form of a proximity switch sealed from the container interior, and is actuated by a magnet supported at a lateral region of the float adjacent said switch to operate the switch as the float rises.

BRIEF DESCRIPTION OF THE DRAWINGS

Embodiments of the present invention will now be described by way of example with reference to the accompanying drawings, wherein.

DESCRIPTION OF THE PREFERRED EMBODIMENTS

Figure 1:
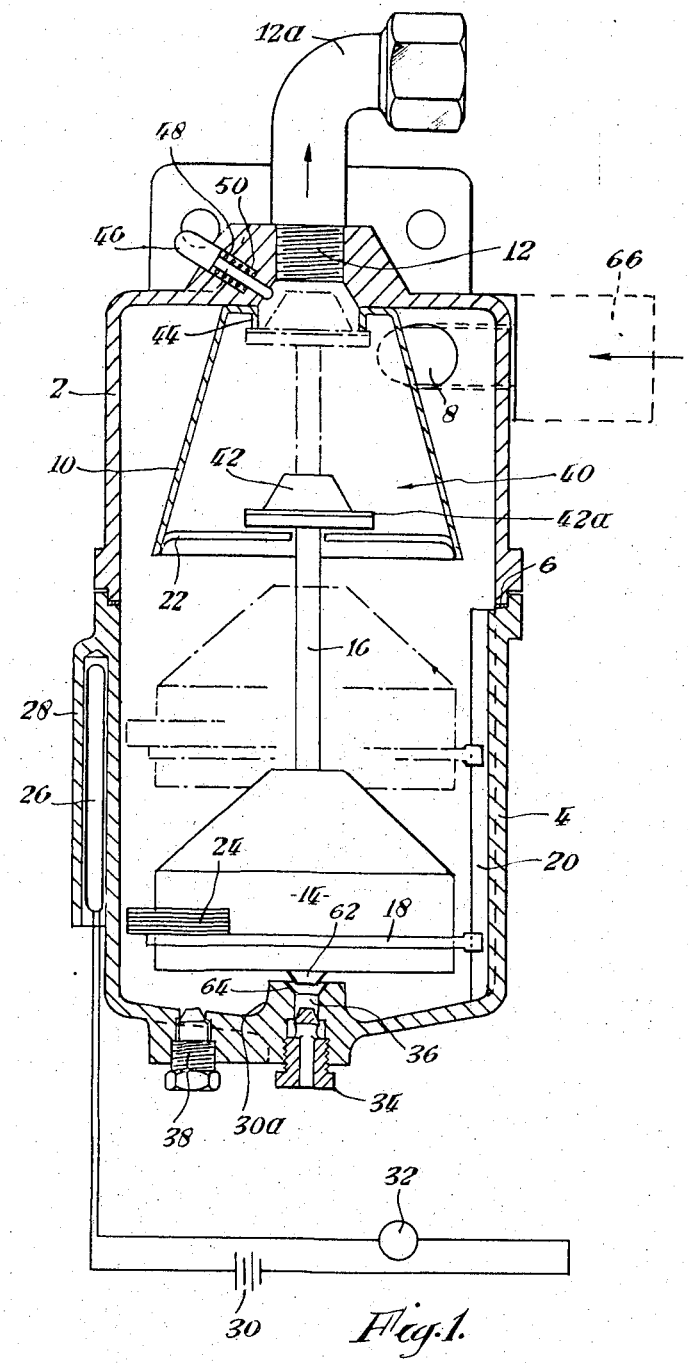
FIGS. 1 and 2 are diagrammatic sectional elevations of respective mixture separation devices according to the invention for removing water from diesel fuel oil.

In both illustrated embodiments the separator container has a light alloy body formed by top and bottom halves 2, 4 secured together by conventional securing means (not shown) such as studs extending vertically through the body close to its cylindrical wall. The joint between the parts is rendered fluid-tight by a gasket 6.

A liquid inlet 8 is directed tangentially into the upper body half 2 such that the entering liquid flows in a descending spiral manner around the exterior of a swirl cone 10, the interior of which forms a frusto-conical conduit into which the liquid enters, as it passes the bottom edge of the cone, to flow to outlet 12. The rotating motion of the liquid past the exterior of the cone, allied with its increasing velocity as the area available for the flow decreases with the downwards flare of the cone 10, and in addition the sudden change of direction as the liquid passes the bottom edge of the cone and moves upwards into the conduit towards the outlet 12, will tend to cause any constituent, i.e., liquid or suspended solid, that is denser than the main mass of the flow to separate out and the separated constituent then settles in the bottom region of the container. The central, verticaly directed position of the outlet in both examples allows the use of a swivelling connector 12a (illustrated only in FIG. 1) to an outlet conduit (not shown) at any angular position about the separator and so facilitates the mounting of the separator.

In the container bottom region is a float 14 mounted on a spindle 16 and having attached to its periphery a locating bridle 18 slidably engaging a plurality of guide ribs 20 (only one of which is shown) moulded integrally with the body half 4. The spindle 16 is slidably received in a guide 22 secured to the lower end of the swirl cone or other suitable support means and between the arms of which there are large openings for the free passage of liquid into the swirl cone. The density of the float with its attached parts is greater than that of the fluid that the separator is required to pass, but only marginally so, so that the settling of the denser constituent in the bottom region of the container will cause the float to rise on its guides as the level of that constituent rises.

The float carries a permanent magnet 24 that is circumferentially aligned with a proximity switch 26 located in a housing 28 formed on the exterior of the casing lower part 4 and therefore isolated from the liquid in the container, and as the float arises the switch is operated by the magnet. Operation of the switch, which is in a circuit powered by a battery 30, actuates an externally located warning signal device 32, which may give a visual and/or aural signal, to indicate to the operator that the separated denser constituent is to be drained to avoid too great an accumulation and the risk that some of that constituent will perhaps be carried over through the separator top outlet.

Figure 2:
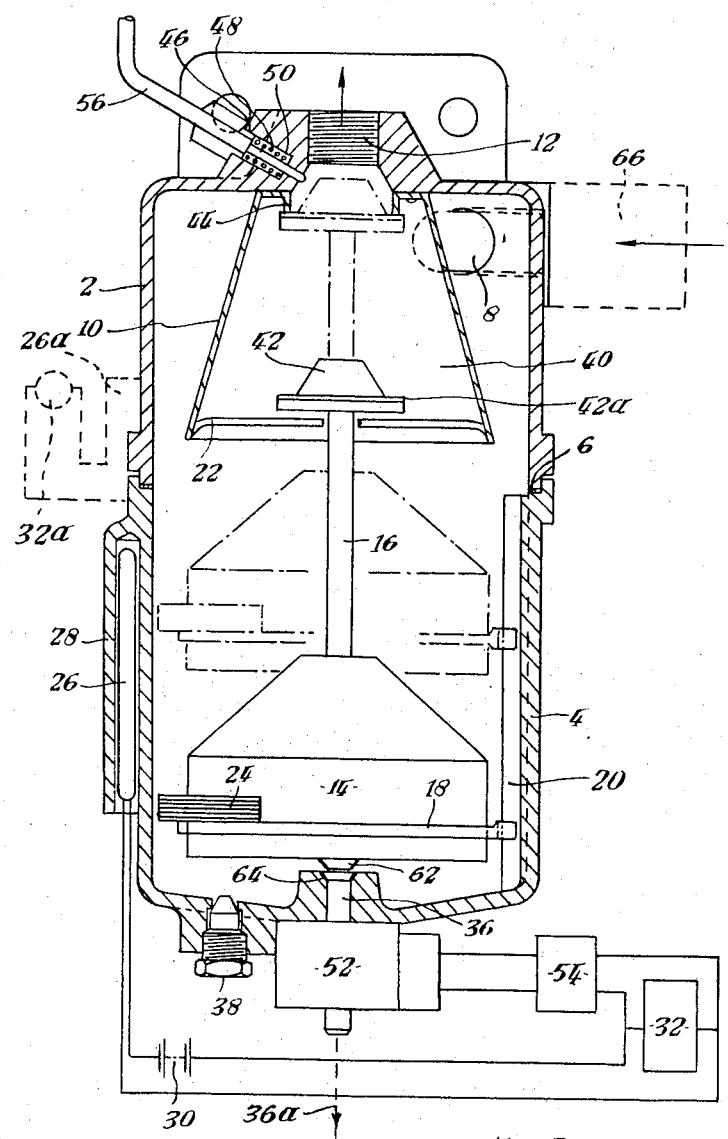

In the illustrated embodiment the settled constituent is drained by opening a plug valve 34 at a drain port 36 in the bottom of the separator but it will be appreciated that a drain conduit can lead from the bottom of the separator to a remotely placed drain valve if required: such a drain conduit is illustrated in FIG. 2 at 36a. The port 36 is set in a boss 30a so that its inlet is slightly above the bottom inside surface of the separator: sediment deposits can thus settle on said surface and not be drawn into the drain valve itself where they may cause a blockage. A supplementary plug 38 is provided to allow any collected sediment to be cleaned out from time to time.

As a further precaution against the carrying over of the denser constituent to the top outlet 12, there is preferably also a shut-off valve 40 in the upper region of the container arranged to stop the flow through the outlet 12 automatically if the accumulation of the denser constituent becomes too great. This comprises a valve head 42 with attached seating washer 42a and a downturned circular lip 44 of the swirl cone providing a seating for the valve head. The valve head is attached to the top of the spindle 16 and if the float rises sufficiently, the valve head washer comes into contact with the seating 44, so preventing the passage of further liquid to outlet 12. A further external warning device can be provided to indicate that the valve has closed: this is exemplified in FIG. 2 by the proximity switch 26a and warning device 32a shown in broken lines. Preferably the connection between the spindle and valve head is such as to permit slight tilting of the head so that the head can align itself to the valve seating as it is urged against the seating by the buoyancy force of the float and the suction drawing the liquid through.

Under normal circumstances, the drain valve will be operated before the valve body 42 has risen far enough to contact its seating but should the operator not do this, the flow through the separator is stopped by the closure of the valve. When this occurs in the fuel line of a conventional diesel engine, for example, the engine fuel supply means will create a fall of pressure at the separator outlet holding the valve firmly against its seat and this will normally be reinforced by a positive pressure on the other side of the valve since it is generally desirable to mount the separator at a level below that of the fuel tank. In these conditions, after drainage of the denser constituent from the bottom of the container, the valve body 42 remains firmly sealed against its seating.

A manual reset device is provided therefore to unseat the valve body, this device comprising a plunger 46 normally held in an upper position by a spring 48. Leakage from the container at this region is prevented both by an O-ring 50, and a protective rubber cover (not shown) may enclose the outer end of the plunger. It will be seen that, with the valve body bearing on its seating, depression of the plunger brings it against the valve body to push it off its seating. This would immediately allow the pressures on opposite sides of the valve body to equalise and, if that denser constituent has been drained away so that the float can now fall, the separator will be able to operate normally again. It will be clear that the plunger can be operated from a remote position if required, e.g. by solenoid or Bowden cable (as indicated at 56 in FIG. 2).

The separator shown in FIG. 2 is similar in many respects to the construction in FIG. 1, and corresponding parts are indicated by the same reference numbers. In this construction, however, provision is made for automatic draining, a sucton pump at the drain port 36 being in circuit with the battery 30, and when the pump is started by operation of the proximity switch 26 the settled denser constituent is drawn from the separator. As this liquid leaves the container, the float will fall and the proximity switch will open to de-energize the pump when the level of the denser constituent has dropped so far that the float is close to the bottom of the container.

The warning signal device 32 of the first embodiment may be associated with the pump to indicate to the operator when draining is taking place: as illustrated, the operation of the signal device 32 is dependent on the closure of the switch 26 but if desired, an alternative or further signal can be actuated by the main pump signal to indicate that the drain port has actually been opened. This would be done by conventional circuitry well known in the electrical art and does not therefore required illustration.

The illustated circuit includes a time delay relay 54, which may not always be required. The function of the relay would be to delay the de-energization of the solenoid valve. Thus, the circuit would then be so arranged that the re-opening of the proximity switch did not itself deenergize the pump but triggered the delay relay and then, only after the relay had timed itself out, would the pump be switched off. In this way more complete draining and possible even flushing of the lower region of the body can be obtained.

As in the first embodiment, a shut-off valve 42 is provided to cut off the flow if, for example, there has been an electrical fault or if the proportion of denser constituent entering the container is too great to be drained off at a rate which will lower its level. An external reset device such as the plunger 46 is thus also required and is operated by a remote control linkage 56.

It should be appreciated that the automatic operating sequence actuated by the proximity switch can be provided with the pump in other positions than that illustrated. For example, the drain conduit may run from the outlet 36 to a remotely mounted pump operated by the proximity switch in the manner already described. The pump might conveniently be a vane-type pump, and, if so, or if any other non-sealing form of pump is used, it would incorporate a non-return valve to prevent loss of liquid or ingress of air.

In both embodiments it will be seen that the bottom face of the float 14 is provided with an integral or separately attached frusto-conical plug body 62 that is arranged to seal against a seating 64 on the entry of the port 36. Thus, when draining takes place and the float falls, the flow through the port 36 will cease as the body 62 is brought against the seating 64. In this way, if for example the solenoid valve should stick open, the unrestricted escape of liquid from the separator may be prevented.

A further preferred feature illustrated is a heater unit 66 immediately preceding the inlet port 8 of the separator. This is intended to function, for example, when diesel fuel having some water content is being drawn through the separator in low temperature conditions when water droplets carried in the fuel can freeze into ice particles. Since these particles may not operate the float mechanism satisfactorily and may in any case build up to form a blockage, the heater unit is provided to ensure melting and its location at the entry to the separator is particularly advantageous in helping to avoid a blockage of the fuel flow there.

What I claim and desire to secure by Letters Patent is:

1. A device for separating denser and lighter constituents of a mixture of liquids or a solid material and a liquid, comprising, in combination, i. a container, ii. a drain outlet in a lower region of the container, iii. a barrier in an upper region of the container dividing said upper region into an inner space and an outer space surrounding said inner space,
iv. an inlet for the mixture into the container opening into said upper region outer space,
v. an outlet from the chamber being disposed in an upper part of said inner space,
vi. said inlet being directed obliquely to the barrier to impart to the entering mixture a circulatory motion around the barrier whereby centrifugal separation of the mixture is initiated as it flows to the lower limit of the barrier, the arrangement being such that the denser constituent settles in said lower region and the lighter constituent flows to said outlet by way of said inner space,
vii. a float in said lower region being displaceable upwardly by buoyancy forces as the denser constituent accumulates there,
viii. an electrical proximity switch disposed on or adjacent a side of the container below said upper region to be laterally offset from the float,
ix. a mounting for said switch maintaining the switch in a space sealed from the container interior,
x. a magnet mounted on a lateral region of the float adjacent said switch for operation of the switch as the float rises,
xi. external means being actuated by the operation of the proximity switch for indication of the rising of the float and/or for opening said drain outlet, whereby the settled denser constituent can be drained from the container through said outlet,
xii. a shut-off valve disposed in the container above the float to be closed by the float when the float has risen above a position at which said external means are to be operated,
xiii. said shut-off valve comprising a valve seating in said inner space in the path of the flow through said space and a valve body upwardly displaceable by said rising of the float to engage with the seating and stop the outflow of the separated lighter constituent from the container after said position is passed,
xiv. an externally operable device being provided for displacement of the shut-off valve body from its seating to permit said outflow to restart when the float descends again after closure of the valve.

2. A device according to claim 1 wherein a suction pump communicates with said drain outlet for the extraction of the settled denser constituent and is controlled by said switch-actuated external means.

3. A device according to claim 1 wherein the container outlet in said inner space projects substantially vertically from the central portion of the top of the container whereby an outlet conduit attached to said outlet can be positioned to extend in any of a range of directions laterally of the container.

4. A device according to claim 1 comprising a seating on the drain outlet, a closure member being provided as part of or permanently connected to the float whereby ascent of the float can bring said member against the seating to prevent further flow through the drain outlet.

5. A device according to claim 1 wherein an entry to the drain outlet is spaced above a bottom wall of said container lower region and a further outlet is provided for removing, from the lower region, material that has settled below the level of said drain outlet entry.

6. A device according to claim 1 wherein heating means are provided immediately adjacent the mixture inlet.

7. A device according to claim 1 wherein the proximity switch is in the form of an elongate reed switch extending over at least a substantial part of the height of said lower region of the container.

8. A device according to claim 4 wherein said drain outlet seating has an upwardly facing sealing surface and a downwardly facing sealing surface on the closure member cooperates therewith.

* * * * *